(12) United States Patent
Boote et al.

(10) Patent No.: US 11,723,342 B2
(45) Date of Patent: *Aug. 15, 2023

(54) COMPOSITION COMPRISING LIGNOCELLULOSIC FIBROUS MATERIAL FOR HORTICULTURAL USE AND METHOD

(71) Applicant: CCD Holdings LLC, Holland, MI (US)

(72) Inventors: Carey J. Boote, Holland, MI (US); Russ Malek, Grand Rapids, MI (US)

(73) Assignee: CCD Holdinas LLC, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,359

(22) Filed: Jul. 30, 2021

(65) Prior Publication Data

US 2021/0352868 A1    Nov. 18, 2021

Related U.S. Application Data

(63) Continuation of application No. 16/278,252, filed on Feb. 18, 2019, now Pat. No. 11,109,564, which is a continuation of application No. 15/970,993, filed on May 4, 2018, now Pat. No. 10,244,730, which is a continuation of application No. 15/151,030, filed on May 10, 2016, now Pat. No. 9,999,198, which is a continuation of application No. 14/485,066, filed on Sep. 12, 2014, now Pat. No. 9,332,727, which is a continuation of application No. 14/294,293, filed on Jun. 3, 2014, now Pat. No. 8,893,652, which is a continuation of application No. 13/427,511, filed on Mar. 22, 2012, now Pat. No. 8,757,092.

(60) Provisional application No. 61/466,301, filed on Mar. 22, 2011.

(51) Int. Cl.
 *A01K 1/015*    (2006.01)

(52) U.S. Cl.
 CPC .......... *A01K 1/0155* (2013.01); *A01K 1/0152* (2013.01)

(58) Field of Classification Search
 None
 See application file for complete search history.

(56) References Cited

U.S. PATENT DOCUMENTS

| | | | |
|---|---|---|---|
| 5,637,312 A * | 6/1997 | Tock | A23K 20/105 119/174 |
| 6,451,589 B1 | 9/2002 | Dvorak | |
| 7,078,229 B2 | 7/2006 | Dvorak | |
| 7,179,642 B2 | 2/2007 | Dvorak | |

(Continued)

*Primary Examiner* — Joseph D Anthony

(74) *Attorney, Agent, or Firm* — Nyman IP LLC; Scott Nyman

(57) ABSTRACT

A composition comprising lignocellulosic fibrous material for horticultural use is provided having one or more solvents and a fiber, wherein the fiber has been processed by ruminant digestion and anaerobic digestion. A method for preparing a composition comprising lignocellulosic fibrous material for horticultural use is also disclosed including the steps of providing excrement from a ruminant which has undergone ruminant digestion, introducing the ruminant excrement into an anaerobic digester, modifying the ruminant excrement to a first wet product, modifying the first wet product to generate a first dry product, and densifying the first dry product to, in turn, generate the composition comprising lignocellulosic fibrous material for horticultural use.

19 Claims, 2 Drawing Sheets

(56) References Cited

U.S. PATENT DOCUMENTS

| | | | |
|---|---|---|---|
| 7,909,995 B2* | 3/2011 | Jiang | B01D 53/1468 210/206 |
| 8,202,721 B2 | 6/2012 | Dvorak | |
| 8,414,808 B2 | 4/2013 | Dvorak et al. | |
| 8,613,894 B2 | 12/2013 | Zhao et al. | |
| 8,757,092 B2* | 6/2014 | Boote | A01K 1/0155 119/171 |
| 8,765,010 B2* | 7/2014 | Boote | B01J 20/24 119/171 |
| 8,893,652 B2* | 11/2014 | Boote | A01K 1/0152 264/109 |
| 8,894,879 B2* | 11/2014 | Boote | B01J 20/24 119/171 |
| 9,332,727 B2* | 5/2016 | Boote | A01K 1/0152 |
| 9,339,760 B2 | 5/2016 | Kennedy et al. | |
| 9,999,198 B2* | 6/2018 | Boote | A01K 1/0152 |
| 10,244,730 B2* | 4/2019 | Boote | A01K 1/0155 |
| 10,556,804 B2 | 2/2020 | Zhao et al. | |
| 11,109,564 B2* | 9/2021 | Boote | A01K 1/0152 |
| 2002/0134315 A1* | 9/2002 | Boden | A01K 1/0152 119/171 |
| 2008/0035036 A1* | 2/2008 | Bassani | C10L 5/42 110/224 |
| 2009/0206028 A1* | 8/2009 | Jiang | B01D 53/1468 210/603 |
| 2010/0212262 A1* | 8/2010 | Townsend | A01K 1/01 53/438 |
| 2012/0276647 A1* | 11/2012 | Mills | G01N 21/78 436/113 |
| 2012/0285384 A1* | 11/2012 | Boote | A01K 1/0152 119/28.5 |
| 2013/0126781 A1* | 5/2013 | Boote | B01J 20/24 252/184 |
| 2015/0344380 A1* | 12/2015 | Fanning | C05B 7/00 504/206 |

* cited by examiner

COMPOSITION COMPRISING LIGNOCELLULOSIC FIBRIOUS MATERIAL FOR HORTICULTURAL USE AND METHOD

CROSS-REFERENCE TO RELATED APPLICATION

This application is a continuation of and claims the priority from U.S. patent application Ser. No. 16/278,252 filed Feb. 18, 2019 with the title "Soil Amendment and Method"; which is a continuation of and claims the priority from U.S. Pat. No. 10,244,730, which issued from U.S. patent application Ser. No. 15/970,993 filed May 4, 2018 with the title "Digestate Composition Comprising Lignocellulosic Fibrous Material and Method"; which is a continuation of and claims the priority from U.S. Pat. No. 9,999,198, which issued from U.S. patent application Ser. No. 15/151,030 filed May 10, 2016 with the title "Animal Bedding and Associated Methods for Preparing and Using the Same"; which is a continuation of and claims the priority from U.S. Pat. No. 9,332,727, which issued from U.S. patent application Ser. No. 14/485,066 filed Sep. 12, 2014 with the title "Animal Bedding and Associated Methods for Preparing and Using the Same"; which is a continuation of and claims the priority from U.S. Pat. No. 8,893,652, which issued from U.S. patent application Ser. No. 14/294,293 filed Jun. 3, 2014 with the title "Animal Bedding and Associated Method for Preparing the Same"; which is a continuation of and claims the priority from U.S. Pat. No. 8,757,092, which issued from U.S. patent application Ser. No. 13/427,511 filed Mar. 22, 2012; which claims priority to U.S. provisional patent application Ser. No. 61/466,301 filed Mar. 22, 2011 with the title "Fibrous Materials and Associated Methods for Using the Same." The foregoing applications are incorporated in their entirety herein by reference.

FIELD OF THE INVENTION

The present disclosure relates to a composition comprising lignocellulosic fibrous material, which may include a digestate composition. More particularly, the disclosure relates to composition comprising lignocellulosic fibrous material for horticultural uses producible via ruminant digestion and anaerobic digestion.

BACKGROUND

The present disclosure relates in general to composition comprising lignocellulosic fibrous material horticultural uses, digestate compositions and, in some examples, to animal bedding (e.g., horse bedding, etcetera) which comprises fiber which has been processed by ruminant digestion and anaerobic digestion. The digestate compositions, including animal bedding, and associated methods of the present disclosure are environmentally beneficial because they convert waste to resources, reduce air and water pollution, and directly contribute to the procurement of sustainable biological systems.

Animal bedding products have been known in the art for years and are the subject of a plurality of publications and patents including: U.S. Pat. No. 2,708,418 entitled "Animal Bedding," U.S. Pat. No. 4,458,629 entitled "Litter for Mammals and Fowl," U.S. Pat. No. 5,054,434 entitled "Suppression of Ammonia Odors from Animal Wastes," U.S. Pat. No. 6,276,300 entitled "Animal Litter," U.S. Pat. No. 6,386,144 entitled "Method of Manufacturing Absorbent Material for Conversion to Fertilizer," U.S. Pat. No. 6,474,267 entitled "Pelletized Animal Bedding and Process and Tool for Sifting Manure Therefrom," U.S. Pat. No. 6,619,234 entitled "Absorbent Compacted Composition," U.S. Pat. No. 6,698,380 entitled "Animal Bed from Cottonseed," U.S. Pat. No. 6,991,783 entitled "Absorbent, Deodorizing, Hygienic Animal Bedding Composition and Method of Manufacture," and U.S. Pat. No. 7,617,798 entitled "Animal Bedding Additive and Animal Bedding Containing the Same," all of which are hereby incorporated herein by reference in their entirety—including all references cited therein.

U.S. Pat. No. 2,708,418 appears to disclose bedding material for poultry and animals adapted particularly to absorb liquids and other excrement. The bedding material is manufactured from paper pulp, and preferably small pieces of paper pulp adapted to absorb rapidly any liquid resulting from animal excrement.

U.S. Pat. No. 4,458,629 appears to disclose pelletized mammal or fowl litter, particularly useful for domestic pets and laboratory animals. The litter provides a highly absorbent, antibacterial, antifungal and odor control bedding which is composed of defibered cellulosic materials mixed with chemicals, obtaining properties described therein. The composition which is chemically of a basic pH is compressed into pellet form to provide improved handling and antitracking qualities.

U.S. Pat. No. 5,054,434 appears to disclose one solution to the accumulation of gaseous ammonia in areas wherein animals are housed or maintained by providing to the areas animal litter, bedding, or other absorbent material which contain a low molecular weight, non-volatile organic acid. Acids such as citric, malic, fumaric, phosphoric, tartaric, maleic, malonic, succinic, sorbic and mixtures of these acids are used and especially phosphoric and fumaric. These acids can be used in concentrations of about 0.0001 to 2 weight % of the dry bedding.

U.S. Pat. No. 6,276,300 appears to disclose a litter composition including paper, sawdust, and zeolite molecular sieve. The composition is formed into pellets or discs having a size, soil-like consistency, and texture which is believed to be attractive to dogs. In addition, the litter has a high degree of absorption and odor control. The litter composition may further include sphagnum moss to provide additional absorbency.

U.S. Pat. No. 6,386,144 appears to disclose a method of producing an organic fertilizer from a highly absorbent animal bedding material manufactured from recycled waste paper, cotton fiber, cotton gin waste, and gypsum. The recycled waste products are combined to form a slurry mixture for processing by conventional paper making machinery into sheet material. Various chemical additives are admixed to the slurry mixture to control bacterial growth in the bedding material. The sheet material is further processed into sized particles to provide an animal bedding such as poultry litter. After the highly absorbent material is saturated with nutrient-rich animal excrement, it is subjected to chemical analysis and further processed to provide a biodegradable, organic fertilizer. The absorbent bedding material has alternative uses such as for collection of liquid chemical spills and for the remediation of such spills by biodegradation. The converted organic fertilizer can also be used as a ruminant feed after chemical analysis and the elimination of harmful microorganisms.

U.S. Pat. No. 6,474,267 appears to disclose an animal bedding material consisting of compacted and compressed pelletized sawdust particles or granules of relatively uniform size by a pellet fork specifically designed to enable the pellets or particles to sift through the tines of the fork while retaining all but the tiniest particles of manure atop the tines for disposal. The pellet fork is uniquely and specifically designed to provide an improved sifting function not previously possible with other bedding materials except when using a mechanized sifter, resulting in substantial material and labor cost savings, longer life and easier maintenance of bedding, reduction of cleaning time per stall, improved cleanliness of stalls and attendant improved health of the animals. The volume of waste and bedding removed from a horse stall during cleaning may reduce a manure pile as much as 70% compared to conventional use of straw.

U.S. Pat. No. 6,619,234 appears to disclose an absorbent compacted composition which consists essentially of clay, a finely divided cellulosic material, such as fir, and finely divided pine. The amount of finely divided cellulosic material and finely divided pine is enough to bind the composition into a compacted form without additional binders or water addition. Also, the amount of pine is sufficient to reduce the friction heat during compaction to no greater than about 200 degrees Fahrenheit.

U.S. Pat. No. 6,698,380 appears to disclose a method for improving the comfort, health, and grooming of an animal by providing a bedding material made of cottonseeds. A fragrance and/or a pesticide may be added to the cottonseeds.

U.S. Pat. No. 6,991,783 appears to disclose an animal bedding composition and method of manufacture which includes cut or shredded pieces of multiple panel corrugated cardboard kraft paper structures having an internal corrugated panel sandwiched between outer panels, and an adsorptive deodorizing ion exchange agent such as a zeolite dispersed throughout the cardboard pieces and carried on outer and inner surfaces of the pieces of cardboard and on outer and inner surfaces of the corrugations to provide a comfortable, hygienic and deodorized floor covering for animal stalls. An automated method of manufacturing the animal bedding composition is also described. The ion exchange agent attaches to surfaces of the corrugated cardboard which serves as a carrier to sanitize and deodorize a stall. The open structure of the cut corrugations provides mechanical load absorption, and a wicking action to aerate moisture from a stall. The ion exchange agent carried by the corrugated pieces removes ammonia odor from urine and provides slow release potassium and, when loaded with ammonium, slow release of nitrogen for agricultural fertilization. Carbon in the kraft paper from which the corrugated cardboard is constructed attracts nitrogen from urine, yielding excellent fertilizing material with rapid biodegradation.

U.S. Pat. No. 7,617,798 appears to disclose an animal bedding mixture which includes a bedding material and a bedding material additive. The bedding material is preferably straw, sawdust, sand or recycled manure solids. The bedding material additive is preferably 60-99% by weight absorbent clay powder, 0.1 to 35% by weight chlorite salt, and 0.01-35% by weight sodium bisulfate or sodium percarbonate. The bedding material additive of the present disclosure is inert when dry and neither germicidal or acidic. However, when the additive is exposed to moisture, such as animal urine, the sodium bisulfate will acidify the liquid, causing the formation of hypochlorous acid and chlorine dioxide. Hypochlorous acid and chlorine dioxide are very powerful, broad spectrum germicides that have proven efficacy against *E. coli, Staphylococcus aureus*, and other micro-organisms commonly found in animal bedding.

While animal bedding products have been known in the art for years, issues associated with bedding durability, absorbency, waste, compostability, biodegradability, animal and human health as well as facilitating sustainable biological systems remain largely problematic.

Therefore, it is an object of the present disclosure to provide a digestate composition that can be usable as an animal bedding, soil amendment products, and/or compositions that comprises lignocellulosic fiber which can be used for horticultural use which has been processed by ruminant digestion and anaerobic digestion. Such product converts waste to resources, reduces air and water pollution, and directly contributes to the procurement of sustainable biological systems.

These and other objects of the present disclosure will become apparent in light of the present specification, claims, and drawings.

Therefore, a need exists to solve the deficiencies present in the prior art.

SUMMARY

Accordingly, the disclosure may feature a composition comprising lignocellulosic fibrous material for horticultural use including at least one solvent and a fiber processed by ruminant digestion and anaerobic digestion. A density fiber of the composition comprising lignocellulosic fibrous material for horticultural use may range from between approximately 0.400 grams per cubic centimeter to approximately 1.40 grams per cubic centimeter.

In another aspect, the fiber may be a lignocellulosic fiber.

In another aspect, the at least one solvent may be present in a concentration of less than approximately 70% by weight.

In another aspect, the at least one solvent may be present in a concentration of less than approximately 50% by weight.

In another aspect, the fiber may include lignin, hemicellulose, and cellulose.

In another aspect, the pH of the composition comprising lignocellulosic fibrous material for horticultural use may be alkaline.

In another aspect, the pH of the composition comprising lignocellulosic fibrous material for horticultural use may range from greater than approximately 8 to less than approximately 10.5.

In another aspect, average particle size of the fiber may be less than approximately 10 microns.

In another aspect, the composition comprising lignocellulosic fibrous material for horticultural use may include a digestate composition.

In another aspect, a specific density of the digestate composition may range from approximately 0.400 grams per cubic centimeter to approximately 1.40 grams per cubic centimeter.

In another aspect, the at least one solvent may be present in a concentration of less than approximately 25% by weight.

In another aspect, an odor suppressant may be included.

In another aspect, the odor suppressant may include an organic ester.

In another aspect, 3-amino-7-dimethylamino-2-methylphenazine hydrochloride may be included.

In another aspect, comprising 3,3-bis(4-hydroxy-2-methyl-5-propan-2-ylphenyl)-2-benzofuran-1-one may be included.

In another aspect, the fiber may be present in a concentration of greater than approximately 40% by weight.

In another aspect, the fiber may be present in a concentration of greater than approximately 50% by weight.

According to an embodiment of this disclosure, a composition comprising lignocellulosic fibrous material for horticultural use derived from ruminant excrement is provided including a solvent and a fiber. The fiber may be processed by ruminant digestion and anaerobic digestion.

In another aspect, the fiber may be a lignocellulosic fiber.

According to an embodiment of this disclosure, a method for preparing a composition comprising lignocellulosic fibrous material for horticultural use is provided. The method may include the steps of providing excrement from a ruminant which has undergone ruminant digestion; introducing the ruminant excrement into an anaerobic digester; modifying the ruminant excrement to a first wet product; modifying the first wet product to generate a first dry product; and densifying the first dry product to generate the composition comprising lignocellulosic fibrous material for horticultural use.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
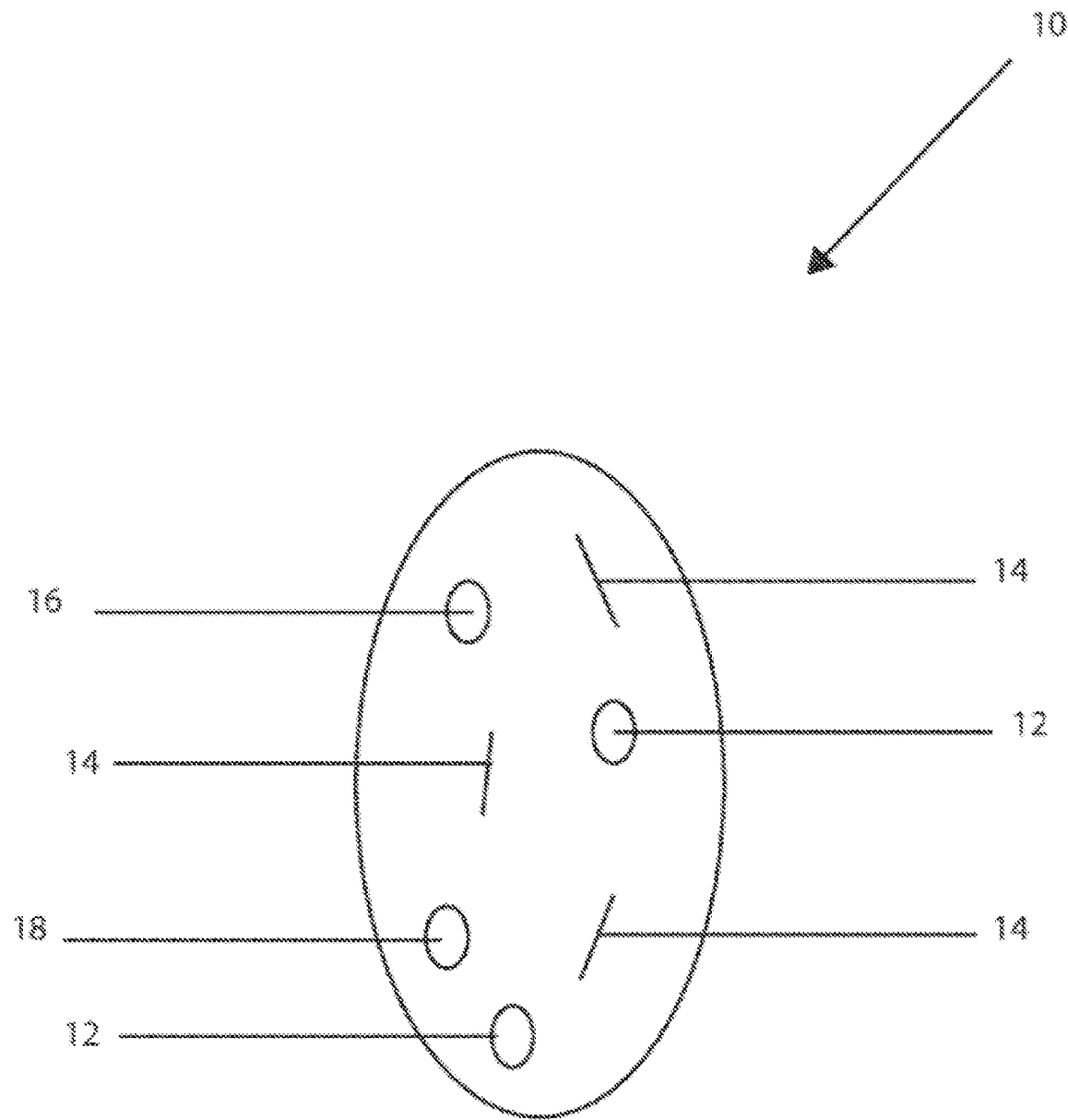
FIG. 1 is a cross-sectional view of a digestate composition usable as a composition comprising lignocellulosic fibrous material for horticultural use, according to an embodiment of this disclosure.

The following disclosure is provided to describe various embodiments of a composition comprising lignocellulosic fibrous material for horticultural use comprising fibrous materials. Skilled artisans will appreciate additional embodiments and uses of the present disclosure that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

Figure 2:
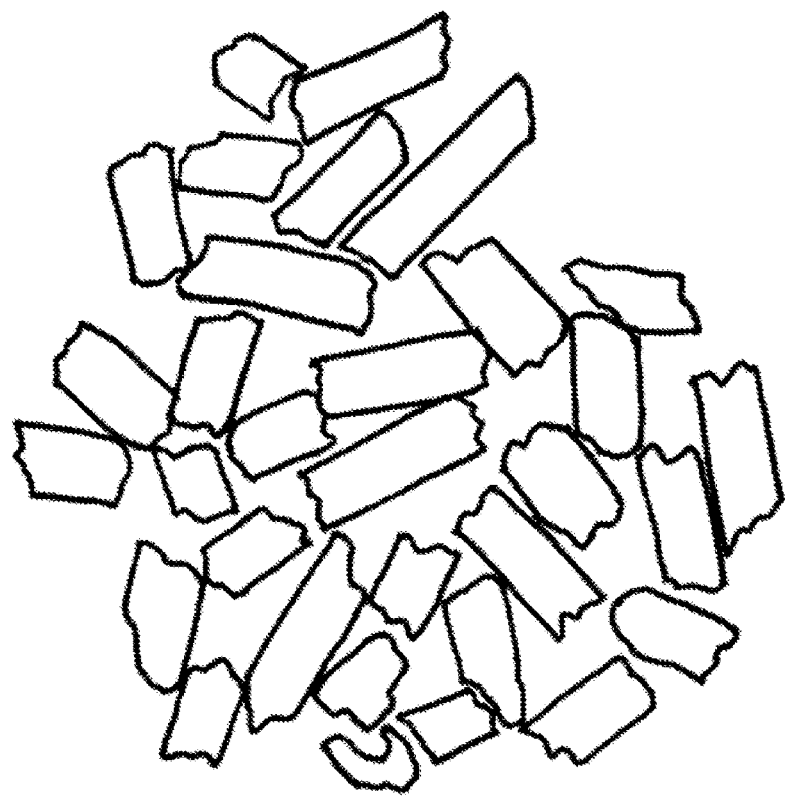
FIG. 2 is a perspective view of a digestate composition usable as a composition comprising lignocellulosic fibrous material for horticultural use, according to an embodiment of this disclosure.

It will be understood that like or analogous elements and/or components, referred to herein, may be identified throughout the drawings with like reference characters. It will be further understood that one or more of FIGS. 1-2 are merely schematic representations of digestate compositions and/or compositions comprising lignocellulosic fibrous material for horticultural uses. As such, some of the components have been distorted from their actual scale for pictorial clarity.

In accordance with the present disclosure, a digestate composition usable in animal bedding and/or as a composition comprising lignocellulosic fibrous material for horticultural use disclosed herein is configured for use in a plurality of applications including, but not limited to, dairy bedding, horse bedding, cat bedding, small animal bedding, soil amendment, for horticultural use, soil additives, etcetera. The digestate composition usable in animal bedding of the present disclosure, among other benefits, has substantially longer stall life (i.e., utilization time), reduces store, farm and/or stall management costs, reduces cleaning costs, reduces material disposal costs, reduces veterinary costs, relative to commercially available animal bedding. Moreover, the digestate composition usable in animal bedding, in soil amendments, and/or for horticultural use of the present disclosure is a direct result of the conversion of waste material to a resource which is biodegradable, compostable, and sustainable with respect to biological systems.

Referring now to the drawings and to FIG. 1 in particular, digestate composition 10 is shown which generally comprises one or more solvents 12 and lignocellulosic fiber 14. Skilled artisans will appreciate additional fibers that may be used, without limitation. It will be understood that lignocellulosic fiber 14 has been processed by both ruminant digestion and supplemental anaerobic digestion. In particular, the ruminant digestion typically occurs in a cow or other animal and the supplemental anaerobic digestion occurs in an anaerobic digester which may be available from a number of sources. It will be understood that sequential ruminant digestion followed by anaerobic digestion chemically and physically alters the original animal excrement into a material having different physical and chemical properties.

One or more solvents 12 of digestate composition 10 preferably comprise water, but other solvents are likewise contemplated for use in accordance with the present disclosure, including nonpolar solvents (e.g., pentane, hexane, benzene, toluene, chloroform, diethyl ether, etcetera) polar aprotic solvents (e.g., acetone, propylene carbonate, tetrahydrofuran, etcetera) and/or polar protic solvents (e.g., water, methanol, ethanol, isopropanol, acetic acid, formic acid, etcetera). Preferably, the concentration of one or more solvents 12 is less than approximately 70% by weight, and more preferably less than approximately 50% weight. It will be understood that one or more solvents 12 of digestate composition 10 are entrapped into the structure of lignocellulosic fiber 14, which among other things, provides for a sponge-like characteristic, as well as facilitates the initiation of cellular absorption. It will be further understood that one or more solvents 12 of digestate composition 10 facilitates attractive forces, including, but not limited to, Van der Waals forces and/or hydrogen bonding between atoms, molecules, and/or surfaces of lignocellulosic fiber 14—including lignin, hemicellulose, and/or cellulose and fibers of the same—just to name a few.

In one embodiment, lignocellulosic fiber 14 includes a combination of lignin, hemicellulose, and cellulose. However, as will be discussed in greater detail below, lignocellulosic fiber 14 may comprise other materials. After being processed by both ruminant digestion and supplemental anaerobic digestion, the density fiber of digestate composition 10 preferably ranges from approximately 0.950 grams per cubic centimeter to approximately 1.40 grams per cubic centimeter. Additionally, lignocellulosic fiber 14 of digestate composition 10 is present in a concentration of greater than approximately 40% by weight, and more preferably present in a concentration of greater than approximately 50% by weight.

In one preferred embodiment of the present disclosure, digestate composition 10 preferably comprises an alkaline pH which ranges from greater than approximately 8 to less than approximately 10.5. However, it will be understood that non-alkaline pH's are contemplated for certain applications.

In another preferred embodiment of the present disclosure, digestate composition 10 includes lignocellulosic fiber 14 which preferably comprises an average particle size of less than approximately 10 microns.

As is best shown in FIG. 2, in one embodiment of the present disclosure, digestate composition 10 can be pelletized. In this embodiment the specific density of the digestate composition usable in animal bedding pellets ranges from approximately 0.400 grams per cubic centimeter to approximately 0.850 grams per cubic centimeter.

When digestate composition 10 is in pellet form, one or more solvents 12 are preferably present in a concentration of less than approximately 25% by weight.

Digestate composition 10 may also include odor suppressant 16. Odor suppressant 16 preferably comprises an organic ester to mask urine and/or feces odor, and may also comprise an odor neutralizer which converts urea to a less odoriferous compound.

In accordance with the present disclosure, digestate composition 10 may also include indicator 18 which visually identifies when digestate composition 10 has been soiled by an animal. Non-limiting examples of indicators 18 include 3-amino-7-dimethylamino-2-methylphenazine hydrochloride and 3,3-bis(4-hydroxy-2-methyl-5-propan-2-ylphenyl)-2-benzofuran-1-one—just to name a few.

The present disclosure is also directed to a method for preparing digestate composition usable in animal bedding, in soil amendments, and/or for horticultural use, comprising the following steps. First, a ruminant animal (e.g., cow, cattle, goat, sheep, giraffe, bison, moose, elk, yak, water buffalo, deer, camel, alpaca, llama, antelope, pronghorn, nilgai, etcetera) is fed with sufficient quantities of bast and/or bast type fibre from one or more sources including, but not limited to, corn, wheat, alfalfa, etcetera. Second, excrement from the ruminant animal which has undergone ruminant digestion via the animal is obtained. Next, the animal excrement is associated with (e.g., placed in) an anaerobic digester which generates a first wet product. After the first wet product is generated, it is placed into a conventional dryer and/or naturally dried which generates a first dry product. The first dry product is suitable for use as digestate composition 10, but may also be densified and/or pelletized using conventional techniques (e.g., compression densification and/or pelletization) digestate composition usable in animal bedding. One commercial source for pelletization is Michigan Wood Fuel Pellets, Holland, Mich.

Lastly, the first wet product and/or the first dry product may be bleached or color altered prior to, during, and/or after densifying the first dry product.

The invention is further described by the following example.

Example I

Perfect Cycle™ Natural Bedding, which is commercially available from Eco-composites LLC, Holland, Mich., was placed into a horse stall. On the same day traditional wood shaving bedding was placed into a separate horse stall. After approximately three days of use, the traditional wood shaving bedding was saturated to the point where the horse was showing signs of dissatisfaction with the bedding. However, the Perfect Cycle™ Natural Bedding of the present disclosure, was still acceptably absorbent after fifteen days and substantial pellet breakdown was not observed until after about 21 days. The Perfect Cycle™ Natural Bedding exhibited a plurality of superior features/characteristics including five times the absorbency and product life compared to traditional wood shaving bedding. Moreover, the odor emanating from the stall with the Perfect Cycle™ Natural Bedding was substantially more acceptable compared to the odor emanating from the stall with the traditional wood shaving bedding. Furthermore, due to, at least in part, the solvent configuration, composition and/or concentration of the Perfect Cycle™ Natural Bedding, the dust observed in the horse stall was substantially reduced compared to the dust observed in the stall with the traditional wood shaving bedding. Lastly, after use, the Perfect Cycle™ Natural Bedding was readily compostable, whereas the traditional wood shaving bedding were required to be disposed of using traditional resources.

Furthermore, as disclosed in the provisional patent application Ser. No. 61/466,301 to which this current application claims priority, separating the fiber solids may leave a loose fiber that can be used as low-cost animal bedding and a soil product, for example, a composition for horticultural use. Those of skill in the art will appreciate that a composition comprising lignocellulosic fibrous material for horticultural use is a composition that helps improve plant growth and health.

Although the provisional application has been incorporated by reference in its entirety, various portions of this disclosure have been amended to include this previously disclosed subject matter in the interest of clarity to demonstrate that the included claims are enabled by such disclosure.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A composition comprising lignocellulosic fibrous material for horticultural use comprising:
   at least one solvent;
   a lignocellulosic fiber processed by ruminant digestion and anaerobic digestion; and wherein the density of the lignocellulosic fiber of the composition comprising lignocellulosic fibrous material for horticultural use is less than approximately 85 pounds per cubic foot.

2. The composition comprising lignocellulosic fibrous material for horticultural use according to claim 1, wherein the at least one solvent comprises a polar aprotic solvent.

3. The composition comprising lignocellulosic fibrous material for horticultural use according to claim 1, wherein the at least one solvent is present in a concentration of less than approximately 70% by weight.

4. The composition comprising lignocellulosic fibrous material for horticultural use according to claim 1, wherein the density of the lignocellulosic fiber of the composition comprising lignocellulosic fibrous material for horticultural use ranges from between approximately 25 pounds per cubic foot to approximately 85 pounds per cubic foot.

5. The composition comprising lignocellulosic fibrous material for horticultural use according to claim 1, wherein the lignocellulosic fiber comprises lignin, hemicellulose, and cellulose.

6. The composition comprising lignocellulosic fibrous material for horticultural use according to claim 1, wherein a pH of the composition is alkaline.

7. The composition comprising lignocellulosic fibrous material for horticultural use according to claim 1, wherein the pH of the composition ranges from greater than approximately 8 to less than approximately 10.5.

8. The composition comprising lignocellulosic fibrous material for horticultural use according to claim 1, wherein the pH of the composition is greater than approximately 8.

9. The composition comprising lignocellulosic fibrous material for horticultural use according to claim 1, wherein the pH of the composition comprising lignocellulosic fibrous material is greater than approximately 7.

10. The composition comprising lignocellulosic fibrous material for horticultural use according to claim 1, wherein the pH of the composition is less than approximately 10.5.

11. The composition comprising lignocellulosic fibrous material for horticultural use according to claim 1, wherein the at least one solvent is present in a concentration of less than approximately 25% by weight.

12. The composition comprising lignocellulosic fibrous material for horticultural use according to claim 1, wherein the at least one solvent comprises water.

13. The composition comprising lignocellulosic fibrous material for horticultural use according to claim 12, wherein the water is present in a concentration of less than approximately 70% by weight.

14. The composition comprising lignocellulosic fibrous material for horticultural use according to claim 1, further comprising 3-amino-7-dimethylamino-2-methylphenazine hydrochloride.

15. The composition comprising lignocellulosic fibrous material for horticultural use according to claim 1, further comprising 3,3-bis(4-hydroxy-2-methyl-5-propan-2-ylphenyl)-2-benzofuran-1-one.

16. The composition comprising lignocellulosic fibrous material for horticultural use according to claim 1, wherein the lignocellulosic fiber is present in a concentration of greater than approximately 40% by weight.

17. The composition comprising lignocellulosic fibrous material for horticultural use according to claim 1, wherein the lignocellulosic fiber is present in a concentration of greater than approximately 50% by weight.

18. A composition for horticultural use derived from ruminant excrement, comprising:
   a solvent;
   a lignocellulosic fiber that has been processed by ruminant digestion and anaerobic digestion; and
   an indicator comprising:
   3,3-bis(4-hydroxy-2-methyl-5-propan-2-ylphenyl)-2-benzofuran-1-one, and/or
   3-amino-7-dimethylamino-2-methylphenazine hydrochloride.

19. A method for preparing a composition comprising lignocellulosic fibrous material for horticultural use, comprising the steps of:
   providing excrement from a ruminant which has undergone ruminant digestion;
   introducing the ruminant excrement into an anaerobic digester;
   modifying the ruminant excrement to a first wet product;
   modifying the first wet product to generate a first dry product; and
   densifying the first dry product to generate the composition comprising lignocellulosic fibrous material for horticultural use;
   wherein the density of the lignocellulosic fiber is less than approximately 85 pounds per cubic foot.

* * * * *